United States Patent
Hegenbart et al.

(10) Patent No.: US 10,202,187 B2
(45) Date of Patent: Feb. 12, 2019

(54) VORTEX GENERATOR ARRANGEMENT

(71) Applicant: Airbus Operations GmbH, Hamburg (DE)

(72) Inventors: Matthias Hegenbart, Hamburg (DE); Wolfgang Eilken, Hamburg (DE); Erich Paul, Hamburg (DE); Bruno Stefes, Hamburg (DE); Lena Duken, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 180 days.

(21) Appl. No.: 15/015,804

(22) Filed: Feb. 4, 2016

(65) Prior Publication Data

US 2016/0229526 A1 Aug. 11, 2016

(30) Foreign Application Priority Data

Feb. 6, 2015 (DE) .................. 10 2015 101 765

(51) Int. Cl.
*B64C 23/06* (2006.01)
*B64C 9/02* (2006.01)
(Continued)

(52) U.S. Cl.
CPC ............... *B64C 23/06* (2013.01); *B64C 9/02* (2013.01); *B64C 13/16* (2013.01); *B64C 21/10* (2013.01); *Y02T 50/162* (2013.01); *Y02T 50/44* (2013.01)

(58) Field of Classification Search
CPC .......... B64C 9/12; B64C 13/16; B64C 23/06; B64C 9/02; Y02T 50/162
See application file for complete search history.

(56) References Cited

U.S. PATENT DOCUMENTS 2,852,209 A * 9/1958 Petre ................. B64C 13/00
244/213
3,112,089 A 11/1963 Dornier
(Continued)

FOREIGN PATENT DOCUMENTS

EP 2543588 1/2013
EP 2801521 11/2014
(Continued)

OTHER PUBLICATIONS

German Search Report for Application No. 10 2015 101 765.2 dated Jun. 26, 2015.
(Continued)

*Primary Examiner* — Michael H Wang
(74) *Attorney, Agent, or Firm* — Jenkins, Wilson, Taylor & Hunt, P.A.

(57) ABSTRACT

A vortex generator arrangement for an aircraft including a surface section, a flap element pivotable between a first position and a second position, a biasing arrangement biasing the flap element towards the second position, retaining devices retaining the flap element in the first or second position, and a release device releasing the flap element from the first retaining device. The biasing arrangement, the first retaining device and the second retaining device are configured such that the second retaining device automatically retains the flap element in the second position after the flap element has been pivoted by the biasing arrangement from the first position into the second position. As soon as the torque exceeds a predetermined value, the second retaining device automatically releases the flap element, which pivots against the force of the biasing arrangement into the first position and is automatically retained therein by the first retaining device.

13 Claims, 2 Drawing Sheets

(51) Int. Cl.
*B64C 13/16* (2006.01)
*B64C 21/10* (2006.01)

(56) References Cited

U.S. PATENT DOCUMENTS

| | | | | |
|---|---|---|---|---|
| 3,144,220 | A * | 8/1964 | Kittelson | B64C 23/00 244/199.1 |
| 4,039,161 | A * | 8/1977 | Bauer | B64C 23/06 138/39 |
| 4,739,957 | A * | 4/1988 | Vess | B64C 9/34 244/199.1 |
| 5,054,720 | A | 10/1991 | Page | |
| 5,209,438 | A * | 5/1993 | Wygnanski | B64C 23/00 244/200.1 |
| 5,253,828 | A | 10/1993 | Cox | |
| 5,730,393 | A * | 3/1998 | Hatrick | B64C 21/00 244/110 B |
| 5,755,408 | A * | 5/1998 | Schmidt | B64C 21/00 244/130 |
| 6,105,904 | A * | 8/2000 | Lisy | B64C 3/58 244/130 |
| 6,481,363 | B1 * | 11/2002 | Liu | B63B 1/248 114/274 |
| 6,685,143 | B1 * | 2/2004 | Prince | B64C 5/12 244/203 |
| 7,028,954 | B2 | 4/2006 | Van Dam et al. | |
| 7,293,959 | B2 * | 11/2007 | Pedersen | F03D 1/0633 416/23 |
| 7,410,133 | B2 * | 8/2008 | Lee | B64C 9/18 244/130 |
| 7,419,356 | B2 * | 9/2008 | Stiesdal | F03D 1/0641 416/1 |
| 7,878,457 | B2 * | 2/2011 | Narramore | B64C 23/06 244/200.1 |
| 8,167,554 | B2 * | 5/2012 | Wang | F03D 1/0608 244/204.1 |
| 8,405,012 | B1 | 3/2013 | Herman et al. | |
| 8,616,494 | B2 * | 12/2013 | Neitzke | F15D 1/12 244/201 |
| 9,267,491 | B2 * | 2/2016 | Vossler | F03D 7/0252 |
| 9,429,400 | B1 * | 8/2016 | Sowle | F24V 10/02 |
| 9,505,485 | B2 | 11/2016 | Dorsett | |
| 2004/0129838 | A1 * | 7/2004 | Lisy | B64C 23/06 244/204.1 |
| 2009/0212158 | A1 * | 8/2009 | Mabe | B64C 9/32 244/1 N |
| 2010/0018322 | A1 | 1/2010 | Neitzke et al. | |
| 2010/0038492 | A1 * | 2/2010 | Sclafani | B64C 7/02 244/199.1 |
| 2011/0142595 | A1 | 6/2011 | Santiago et al. | |
| 2012/0134803 | A1 * | 5/2012 | McGrath | F03D 7/0252 416/1 |
| 2014/0331665 | A1 * | 11/2014 | Shivashankara | B64C 9/32 60/527 |
| 2015/0204306 | A1 * | 7/2015 | Herr | F03D 7/022 416/23 |
| 2016/0229520 | A1 | 8/2016 | Tiryaki et al. | |

FOREIGN PATENT DOCUMENTS

| | | |
|---|---|---|
| JP | S61-54 398 A | 3/1986 |
| JP | 2008094177 | 4/2008 |
| WO | WO 2008 069 948 A1 | 6/2008 |

OTHER PUBLICATIONS

German Search Report for Application No. 10 2015 101 763.6 dated Jul. 7, 2015.
Extended European Search Report for Application No. 16154491 dated Jun. 8, 2016.
Extended European Search Report for Application No. 16154479 dated Jun. 10, 2016.
Notice of Publication for Application No. 15015783 dated Aug. 11, 2016.
Non-Final Office Action for U.S. Appl. No. 15/015,783 dated Dec. 27, 2017.

* cited by examiner

VORTEX GENERATOR ARRANGEMENT

CROSS-REFERENCE TO RELATED APPLICATION

This application claims priority to German Patent Application No. 10 2015 101 765.2 filed Feb. 6, 2015, the entire disclosure of which is incorporated by reference herein.

TECHNICAL FIELD

The present disclosure relates to a vortex generator arrangement for an aircraft comprising a surface section, which is intended for a flow flowing over it and in which an opening is provided, and a flap element, which is supported pivotably about at pivot axis in such a manner that the flap element is pivotable between a first position, in which it extends in the plane of the surface section, and a second position, in which it extends out of the plane of the surface section.

BACKGROUND

The aerodynamic effect or action of aircraft components, such as wings, vertical tailplanes or stabilizers, horizontal tailplanes, rudders, control flaps and high lift devices, is based to a significant extent on the flow profile which is established in operation of the aircraft at the surfaces of the respective aircraft component. However, with increasing angle of attack flow separation or stall may occur, in which condition the flow no longer follows the respective surface, but separates and moves away from the surface, and the aircraft component loses at least part of its effect. The separation of the flow occurs primarily if the boundary layer above the surface does not include sufficient energy for maintaining the flow along the surface contour.

Vortex generators, which are also referred to as swirl vanes or turbulence generators, are projections located on surfaces of aircraft components over which flow occurs, which projections are configured and arranged to selectively generate vortices or turbulence in the boundary layer region of the flow and, in this manner, to supply the flow with energy and maintain the flow along the surface. Thereby a flow separation can be prevented or delayed, and it is possible to realize larger angles of attack without flow separation and stall.

Large angles of attack are necessary, amongst others, at low flight velocity or airspeed, so that measures against the occurrence of flow separation or stall have to be taken, for example, in the take-off and landing phase. Furthermore, critically large angles of attack may also result when the aerodynamically active shape of an aircraft component is selectively strongly changed, for example by strong deflection of a control flap of a wing or strong deflection of a rudder of a vertical stabilizer. A strong deflection of the rudder is required, for example, if thrust is decreasing on one side due to malfunction or failure of engines and steering in the opposite direction must be effected by the rudder in order to maintain the course of the aircraft.

Therefore, there is a need for particular measures for preventing flow separation and stall in particular in specific flight or operating situations. However, vortex generators always also cause an increase of drag and flow resistance so that they are associated with disadvantages outside such flight or operating situations. For this reason vortex generators are known which are selectively extendable and retractable or selectively unfoldable and foldable and which are preferably only extended or unfolded if required and are otherwise retracted or folded in in order not to increase the flow resistance.

SUMMARY

It is an object of the present disclosure to provide a vortex generator arrangement, which is of a particularly simple construction and enables a simple folding in and unfolding, as well as an aircraft comprising such a vortex generator arrangement.

This object is achieved by a vortex generator arrangement having the features disclosed herein and by an aircraft having the features disclosed herein. Advantageous embodiments of the vortex generator arrangement and of the aircraft are the subject-matter of the respective associated dependent claims.

According to the present disclosure a vortex generator arrangement for an aircraft comprises a surface section or surface portion, which is intended to have a flow flowing over it in operation or in flight of the aircraft. In the surface section an opening is provided. The vortex generator arrangement further comprises a flap element which is supported to be pivotable about a pivot axis in such a manner that the flap element is pivotable between a first position, in which it extends in the—possibly curved—plane of the surface section and, for example, closes the opening, and a second position, in which it extends out of the plane of the surface section. In other words, in the second position the flap element projects transversely with respect to the surface section at least partially from the surface section, so that upon establishing a flow above the surface section the flap element extends into the flow and is able to generate turbulence or vortices therein. The first position and the second position are preferably end positions defined by a corresponding stop.

The vortex generator arrangement further comprises a biasing arrangement or mechanism by which the flap element is biased towards or into the second position.

Further, the vortex generator arrangement comprises a first retaining device and a second retaining device. The first retaining device, which may also serve as stop when the first position is an end position, is adapted to retain the flap element in the first position against the force of the biasing arrangement. The second retaining device, which may also serve as stop when the second position is an end position, is adapted to retain the flap element in the second position against a torque acting on the flap element towards the first position. As will become evident later-on, such a torque may be applied in particular by a flow over the surface section.

Finally, the vortex generator arrangement comprises a release or actuating device which is adapted to release the flap element from the first retaining device. The release device may require a manual actuation, for example by a pilot. It is, however, preferred if the release device is actuated or triggered automatically in particular flight situations, such as, for example, upon falling below a particular flight altitude or exceeding a particular ambient pressure, which may be characteristic of a take-off or landing phase.

The biasing arrangement, the first retaining device and the second retaining device are constructed in such a manner that the second retaining device automatically retains the flap element in the second position after it has been pivoted by the biasing arrangement from the first position into the second position, and that, as soon as the torque exceeds a predetermined value, the second retaining device automatically releases the flap element and the flap element pivots against the force of the biasing arrangement into the first position and is automatically retained therein by the first retaining device.

This construction of a vortex generator arrangement has the advantage that not only the unfolding, but also the folding in can be realized in a simple manner and, in particular, also without power. For example, the flap element can be arranged such that in flight of an aircraft provided with the vortex generator arrangement the flow exerts or applies to the flap element a torque towards the first position, when the flap element is in the second position. In this regard, the predetermined value of the torque can be chosen dependent on or as a function of the respective aircraft in such a manner that during take-off and landing the flap element is in the second position and in these phases the velocity or airspeed of the aircraft and, thus, the speed or velocity of the flow acting on the flap element is not sufficient for the torque to exceed the predetermined value, and that only upon exceeding a velocity or airspeed characteristic of these phases the predetermined value of the torque is exceeded. Therefore, no separate mechanical or electrical apparatus is required for moving the flap element into the first position, which simplifies the construction of the vortex generator arrangement. By providing a vortex generator arrangement according to the present disclosure on an aircraft the efficiency of, for example, rudders and control flaps and control surfaces can be maintained to be high also in the case of large angles of attack and low velocities or airspeeds, so that the rudders and control flaps or surfaces can be constructed with smaller dimensions. Because the vortex generator arrangement is of a simple construction, an overall weight saving can be realized in this manner.

In a preferred embodiment the first retaining device and/or the second retaining device is adapted to magnetically retain the flap element in the first position and the second position, respectively. In this regard it is in principle possible to provide corresponding electromagnet or solenoid arrangements. The release device may then be constituted in its entirety or at least in part by a device which is able to switch off a current through the electromagnet or solenoid arrangement of the first retaining device. It is, however, preferred if the first retaining device and/or the second retaining device comprises a permanent magnet arrangement, which may, for example, include neodymium permanent magnets and which is adapted to retain the flap element in the first position and in the second position, respectively. Permanent magnets have the advantage that the first retaining device and the second retaining device, respectively, operates without power and is of a particularly simple construction.

In a preferred embodiment the flap element is part of a component, which is mounted pivotably about the pivot axis in such a manner that it comprises, with respect to the pivot axis, a first lever arm constituted by the flap element and a second lever arm. The two lever arms extend, for example, parallel with respect to each other from opposite sides of the pivot axis. The first retaining device and the second retaining device each engage the second lever arm in order to retain the flap element in the first position and the second position, respectively. Further, the biasing arrangement preferably also engages the second lever arm. This construction of the flap element as one of two lever arms has the advantage that by relative dimensioning of the lever arms an adaptation of the retaining forces exerted by the retaining devices relative to a torque exerted to the flap element in the second position by a flow can be changed in a simple manner. In this way, the vortex generator arrangement can be adapted in a simple manner to different applications and aircraft.

In a preferred embodiment the biasing arrangement comprises a spring element or is constituted by a spring element. Such a spring element may be, for example, a compression spring or a tension spring.

In a preferred embodiment the release device is adapted to release the flap element from the first retaining device automatically upon exceeding of a predetermined pressure. The pressure is the ambient pressure, i.e., the pressure in the environment or vicinity of the vortex generator arrangement. As has already been explained above, the exceeding of a predetermined pressure can serve to identify a particular flight situation and, in particular, a take-off or landing phase.

In this embodiment it is particularly preferred if the release device comprises a release or actuating element and the release device is configured in such a manner that when the flap element is in the first position the release element is spaced from the flap element below the predetermined pressure, and upon exceeding the predetermined pressure is moved such that it engages the flap element and exerts to the flap element a torque acting towards the second position. The first retaining device is then adapted to release the flap element from the first position upon the exertion of this torque by the release element. The release device may, for example, advantageously comprise a pressurized or gas-filled container having an opening which is closed by a membrane in a pressure-tight manner. The membrane is connected to the release element and is configured such that it deforms if the predetermined pressure is exceeded and thereby effects the described movement of the release element for effecting the release of the flap element by the first retaining device. Such a release device is advantageously able to operate without power and fully automatically.

In a preferred embodiment, the flap element projects from the surface section on one side thereof in the second position, and the biasing arrangement, the first retaining device, the second retaining device and/or the release device are disposed on the opposite side of the surface section. If the vortex generator arrangement is part of a flow body and the surface section is part of the surface of the flow body, the latter side is the inner side of interior of the flow body.

In a preferred embodiment the surface section is constituted or formed by a surface of a plate-shaped element, which is provided with the opening and which may be planar or curved. In this or an alternative preferred embodiment the vortex generator arrangement comprises a housing having an interior space or cavity which is accessible through the opening of the surface section. The housing does not extend out of the plane of the surface section. The biasing arrangement, the first retaining device, the second retaining device and/or the release device are disposed within the housing. When combining the two embodiments it is particularly preferred if the housing is connected to the plate-shaped element or is integrally formed in one piece therewith and the plate-shaped element limits a part of the interior space of the housing. In any case, such a vortex generator arrangement is particularly simple to mount in a flow body or in an aircraft and can, in particular, be mounted partially or entirely as a unit.

The vortex generator arrangement according to any of the embodiments and configurations described in detail above may be part of an aircraft, in which the vortex generator arrangement is arranged such that in flight of the aircraft a flow over the surface section is established, which flow acts on the flap element and exerts to the flap element a torque acting towards the first position when the flap element is in the second position. As has already been explained above, it is then possible to realize a fully automatically and powerless folding in into the first position by choosing the predetermined value of the torque such that it is adapted to the aircraft. In particular, the predetermined value of the torque is preferably chosen such that it is not exceeded in a take-off phase and in a landing phase of the aircraft and is reached prior to reaching a cruise speed of the aircraft.

In a preferred embodiment of the aircraft the surface section is part of a surface of a wing, of a vertical stabilizer or tailplane, of a horizontal tailplane, of a rudder, of a control flap or surface, or of a high lift device.

BRIEF DESCRIPTION OF THE DRAWINGS

In the following, a preferred exemplary embodiment is explained with reference to the enclosed drawings.

DETAILED DESCRIPTION

Figure 1:
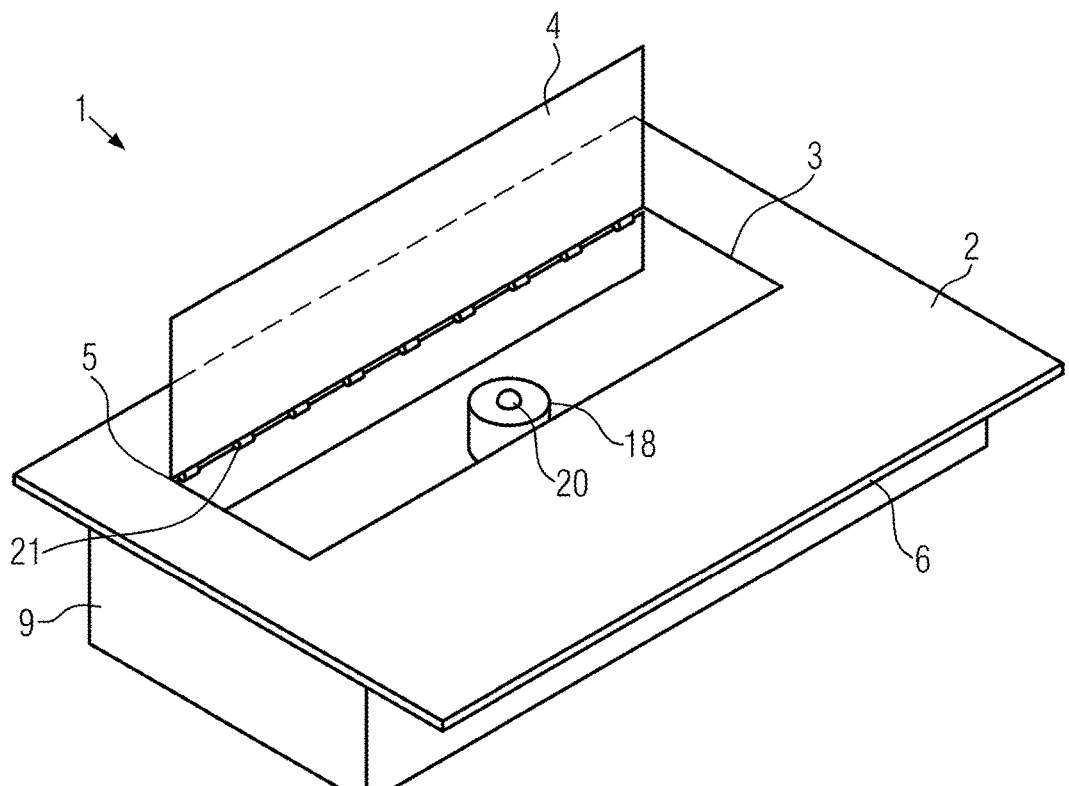
FIG. 1 shows a schematic perspective view of a vortex generator arrangement according to an exemplary embodiment of the present disclosure.

The vortex generator arrangement 1 shown in FIG. 1 comprises a surface section or portion 2, in which an opening 3 is provided. The surface section 2 is intended to have a flow flowing over it when the vortex generator arrangement 1 is mounted in an aircraft and the aircraft moves or flies. Moreover, the vortex generator arrangement 1 comprises a flap element 4 which is pivotable with respect to the surface section 2 about a pivot axis which is configured as a hinge 5. The surface section 2 is constituted by a surface of a plate-shaped element 6.

In FIG. 1 the flap element 4 is shown in an unfolded position, in which it projects perpendicularly from the surface section 2 and extends into a flow when the flow flows over the surface section 2. In this position the flap element 4 is then able to generate turbulence in order to supply the flow with energy in the manner described above.

Figure 4:
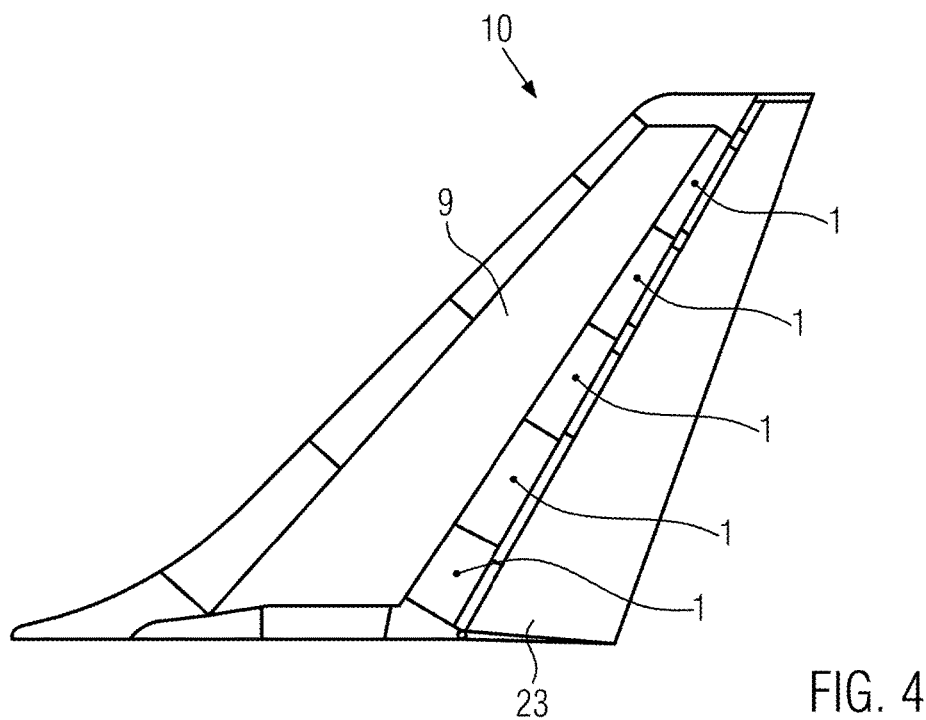
FIG. 4 shows a vertical stabilizer having a plurality of vortex generator arrangements.
Figure 2:
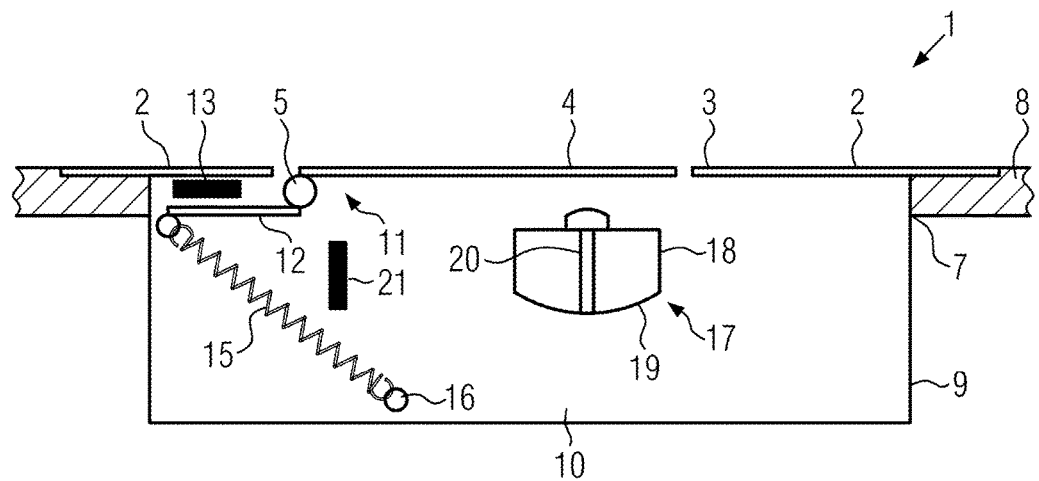
FIG. 2 shows a cross-sectional view of the vortex generator arrangement of FIG. 1 with the flap element in the first position.
Figure 3:
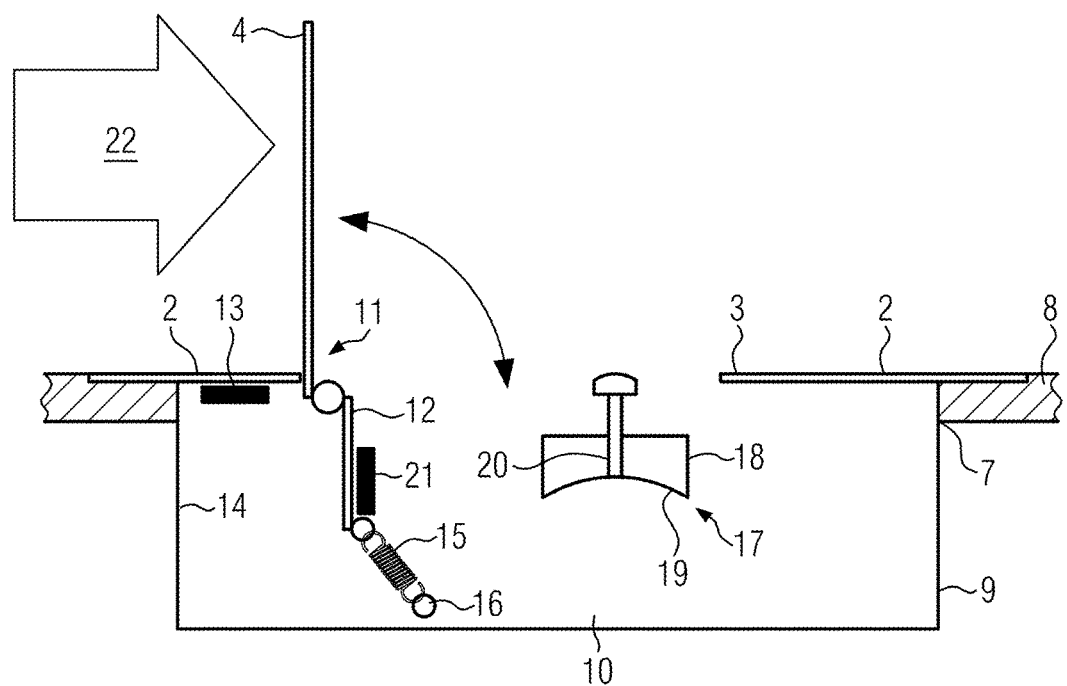
FIG. 3 shows a cross-sectional view of the vortex generator arrangement of FIG. 1 with the flap element in the second position.

In the cross-sectional views of FIGS. 2 and 3 it can be seen that, for use in an aircraft, the vortex generator arrangement 1 is mounted in a recess or cut-out 7 in a wall 8 of a flow body, which is part of an aircraft, such as, for example, a fin 9 of a vertical stabilizer or tailplane 10 (see FIG. 4). With its surface opposite the surface section 2 the plate-shaped element 6 rests, in a peripheral edge region, on the outer surface of the wall 8 in the vicinity of the edge of the recess or cut-out 7. In this area the wall 8 may be recessed in order for the surface section 2 to be able to form an as uniform and smooth surface as possible together with the outer surface of the wall 8.

The vortex generator arrangement 1 further comprises a box-shaped housing 9 which is connected to the plate-shaped element 6 or is integrally formed in one piece therewith on the side opposite the surface section 2. Within this housing 9, the interior space 10 of which is accessible via the opening 3, the further components of the vortex generator arrangement 1 described in the following are disposed. In this way, it is advantageously possible to mount the vortex generator arrangement 1 as a unit in the recess or cut-out 7 of the wall 8, so that the mounting or assembly in general and, in particular, also a retrofitting of existing aircraft with a vortex generator arrangement 1 is possible in a simple manner.

As can be seen best in FIGS. 2 and 3, the flap element 4 is part of a component 11 which is pivotable as a whole about the rotation axis 5. This component 11 also comprises, in addition to the flap element 4, a plate portion 12 which extends away from the rotation axis 5 on the side opposite the flap element 4 and extends parallel to the flap element 4. The flap element 4 and the plate portion 12 are rigidly connected to each other, and the component 11 is preferably formed integrally in one piece and the flap element 4 and the plate portion 12 are portions of the component 11. In any case, the flap element 4 and the plate portion 12 constitute two lever arms with respect to the pivot axis 5.

The pivot axis 5 is mounted in the interior space 10 of the housing 9 at an edge of the opening 3, and the flap element 4 is dimensioned and arranged such that, in the position shown in FIG. 2, it extends in the, possibly curved, plane defined by the plate-shaped element 6 and essentially closes the opening 3. In this folded or folded in position, the surface of the flap element 4 facing away from the interior space 10 is aligned with the surface section 2, so that overall a substantially smooth surface is formed or provided. In order to retain the flap element 4 and the component 11 in this folded position, an arrangement of permanent magnets 13 is provided, which are secured on the surface of the plate-shaped element 6 opposite the surface section 2 and facing the interior space 10 in a region between the pivot axis 5 and a side wall 14 of the housing 9. These permanent magnets 13, which are not shown in FIG. 1, are arranged in such a manner that in the folded position of the flap element 4 the plate portion 12 abuts or bears against the permanent magnets 13 and is magnetically retained by them. Therefore, the plate portion 12 must be constructed from a suitable material, whereas the flap element 4 may also be constructed from a different material.

The vortex generator arrangement 1 further comprises one or more spring elements 15, which are tension springs in the illustrated example. Each of these spring elements 15, which are not shown in FIG. 1, is connected at one end to the end of the plate portion 12 facing away from the pivot axis 5, and at the other end to a mounting or fastening element 16, which is rigidly fixed with respect to the housing 9 in the interior space 10. The spring element 15 or the spring elements 15 is or are configured such that the flap element 4 and the component 11 are biased into the unfolded position shown in FIG. 3 and corresponding to FIG. 1, but that the biasing is not sufficient for overcoming the retaining force of the permanent magnets 13.

In order to be able to bring the flap element 4 and the component 11 into the unfolded position, the vortex generator arrangement 1 further comprises a pressure capsule 17, which in turn comprises a housing 18 having an opening which is closed in a pressure-tight manner by a deformable membrane 19. In the example shown the housing 18 is arranged in the interior space 10 in such a manner that the membrane 19 is facing away from the flap element 4 when the flap element 4 is in the folded position of FIG. 2. In the housing 18 a gas having a defined pressure is disposed.

The membrane 19 is configured such that it is able to flip between a convex shape shown in FIG. 2 and a concave shape shown in FIG. 3 when the pressure in the interior space 10, which is identical to the ambient pressure, exceeds the defined pressure in the housing 18. A release or actuating pin 20 is secured to the membrane 19, which release pin 20 passes through the housing 18 in a pressure-tight manner on the side of the housing 18 opposite the membrane 19 and facing the flap element 4 in the folded position thereof, and which release pin 20 projects from the housing 18 towards the flap element 4.

When the membrane 19 is in its convex shape and the flap element is folded, as shown in FIG. 2, the release pin 20 is spaced from the flap element 4. However, as soon as the membrane 19 flips into its concave shape, the release pin 20 moves towards the flap element 4, and the release pin 20 thereby engages the flap element 4 and exerts to the flap element 4 a torque towards the unfolded position. The membrane 19 and the release pin 20 are configured and arranged such that in this way—together with the biasing by the spring element 15 or the spring elements 15—the retaining effect or action of the permanent magnets 13 is overcome and the flap element 4 is pivoted by the spring element 15 or the spring elements 15 into the unfolded position of FIG. 3. In this regard, it is also possible to adapt the release force of the release pin 20 by, for example, suitable choice of the dimensioning of the pressure capsule or housing 18 and the membrane 19.

In this unfolded position the flap element 4 or the component 11 are retained by a further arrangement of permanent magnets 21, which are fixed inside the interior space 10. These permanent magnets 21, which are not shown in FIG. 1, are consequently arranged such that in the unfolded position of the flap element 4 the plate portion 12 abuts or bears against them and is magnetically retained by them when the flap element 4 pivots into the unfolded position in the manner described. Just like the permanent magnets 13 the permanent magnets 21 constitute a stop, so that the folded position and the unfolded position are the end positions of the possible pivot movement.

The permanent magnets 21 and the spring element 15 or the spring elements 15 are constructed and arranged such that a torque of a predetermined value, which torque is exerted to the flap element 4 towards its folded position by a flow 22 flowing in operation over the surface section 2 (see FIG. 3), overcomes the retaining force of the permanent magnets 21 and is sufficient to move the flap element 4 and the component 11 against the biasing into the folded position, in which it is then, in turn, retained by the permanent magnets 13. The retaining effect or action of the permanent magnets 13 and 21 and the biasing by the spring element 15 or spring elements 15 may alternatively or additionally also be adapted by the dimensioning of the plate portion 12, i.e., one of the lever arms of the component 11, as well as by the arrangement of the permanent magnets 13 and 21 or the spring element 15 or spring elements 15. Of course, the value of the torque exerted by a flow 22 depends on the dimensioning of the flap element 4, i.e., of the other lever arm.

In particular, it is therefore possible in an advantageous manner to construct the vortex generator arrangement 1 such that, depending on the aircraft in which it is employed, the flow 22 in the take-off and landing phase is not sufficient to bring the flap element 4 into the folded position. Rather, the flap element 4 is in its unfolded position, because below a predetermined pressure and, thus, upon falling below a corresponding height, which is characteristic of a landing phase, the pressure capsule 17 causes the flap element 4 to pivot into the unfolded position in the manner described. By contrast, after a take-off phase and at the latest when reaching a cruise speed the flow 22 is sufficient to pivot the flap element 4 in the manner described into the folded position. Thus, it is possible to operate the vortex generator arrangement 1 entirely without power.

FIG. 4 shows a vertical stabilizer or tailplane 10 having a fin 9 and a rudder 23. A plurality of vortex generator arrangements 1 are mounted in the fin 9 immediately in front of the rudder 23 in order to prevent a flow separation or stall at the rudder 23.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vortex generator arrangement for an aircraft, comprising:
   a surface section, which is intended to have a flow flowing over it and in which an opening is provided;
   a flap element which is supported pivotably about a pivot axis such that the flap element is pivotable between a first position, in which it extends in the plane of the surface section, and a second position, in which it extends out of the plane of the surface section;
   a biasing arrangement by which the flap element is biased towards the second position;
   a first retaining device, which is adapted to retain the flap element in the first position against the force of the biasing arrangement;
   a second retaining device, which is adapted to retain the flap element in the second position against a torque acting on the flap element towards the first position; and
   a release device, which is adapted to release the flap element from the first retaining device;
   wherein the biasing arrangement, the first retaining device and the second retaining device are configured such that:
   the second retaining device automatically retains the flap element in the second position after the flap element has been pivoted by the biasing arrangement from the first position into the second position; and
   as soon as the torque exceeds a predetermined value, the second retaining device automatically releases the flap element and the flap element pivots against the force of the biasing arrangement into the first position and is automatically retained therein by the first retaining device.

2. The vortex generator arrangement according to claim 1, wherein the first retaining device and/or the second retaining device is adapted to magnetically retain the flap element in the first position and in the second position, respectively.

3. The vortex generator arrangement according to claim 2, wherein the first retaining device and/or the second retaining device comprises a permanent magnet arrangement, which is adapted to retain the flap element in the first position and in the second position, respectively.

4. The vortex generator arrangement according to claim 1, wherein the flap element is part of a component, which is mounted pivotably about the pivot axis in such a manner that it comprises, with respect to the pivot axis, a first lever arm constituted by the flap element and a second lever arm, wherein the first retaining device and the second retaining device engage the second lever arm in order to retain the flap element in the first position and the second position, respectively, and wherein the biasing arrangement engages the second lever arm.

5. The vortex generator arrangement according to claim 1, wherein the biasing arrangement comprises a spring element.

6. The vortex generator arrangement according to claim 1, wherein the release device is adapted to release the flap element from the first retaining device automatically when a predetermined pressure is exceeded.

7. The vortex generator arrangement according to claim 6, wherein the release device comprises a release element and the release device is configured in such a manner that when the flap element is in the first position the release element is spaced from the flap element below the predetermined pressure, and that upon exceeding the predetermined pressure the release element is moved such that it engages the flap element, if the flap element is in the first position, and exerts on the flap element a torque acting towards the second position, wherein the first retaining device is adapted to release the flap element from the first position when the release element exerts the force.

8. The vortex generator arrangement according to claim 7, wherein the release device comprises a pressurized container having an opening which is closed by a membrane in a pressure-tight manner, wherein the membrane is connected to the release element and is configured such that it deforms when the predetermined pressure is exceeded and thereby effects the movement of the release element.

9. The vortex generator arrangement according to claim 1, wherein in the second position the flap element projects from the surface section on one side thereof, and the biasing arrangement, the first retaining device, the second retaining device and/or the release device are disposed on the opposite side of the surface section.

10. The vortex generator arrangement according to claim 1, comprising a housing having an interior space, which is accessible through the opening of the surface section and in which the biasing arrangement, the first retaining device, the second retaining device and/or the release device are disposed.

11. An aircraft having a vortex generator arrangement according to claim 1, wherein the vortex generator arrangement is arranged such that in flight of the aircraft a flow over the surface section is generated, which flow acts on the flap element and exerts on the flap element a torque acting towards the first position when the flap element is in the second position.

12. The aircraft according to claim 11, wherein the predetermined value of the torque is not exceeded in a take-off phase and in a landing phase of the aircraft and is reached prior to reaching a cruise speed of the aircraft.

13. The aircraft according to claim 11, wherein the surface section is part of a surface of a wing, of a vertical stabilizer, of a horizontal tailplane, of a rudder, of a control flap, or of a high lift device.

* * * * *